April 27, 1926.

R. L. M. DANIELOU ET AL 1,582,641

TRAWLING GEAR

Original Filed Dec. 6, 1923

INVENTORS:
René Louis Marie Danielou
Jacques Jules Verhoeven
BY: Liege, Boyce & Bakelar
ATTORNEYS Patented Apr. 27, 1926.

1,582,641

UNITED STATES PATENT OFFICE.

RENÉ LOUIS MARIE DANIÉLOU AND JACQUES JULES VERHOËVEN, OF LORIENT, FRANCE, ASSIGNORS TO VIGNERON, DAHL & CIE., OF LA ROCHELLE, FRANCE.

TRAWLING GEAR.

Original application filed December 6, 1923, Serial No. 678,905. Divided and this application filed June 16, 1925. Serial No. 37,411.

*To all whom it may concern:*

Be it known that we, RENÉ LOUIS MARIE DANIÉLOU and JACQUES JULES VERHOËVEN, citizens of the French Republic, residing at Lorient, Morbihan, in the French Republic, have invented new and useful Improvements in Trawling Gears, of which the following is a specification.

Our invention relates to trawling gears used in connection with fishing nets which are adapted to be towed by a single boat through the medium of two cables or hawsers connecting to the boat two boards situated during the fishing at a great distance from one another, these boards being connected on the other hand with the net wings by two cables or lines of great length which converge towards the net. The invention described in the present application, which is a division of patent application No. 678,905, filed December 6, 1923, has for its object an improved device for bringing the boards and the net on board after each fishing operation.

According to the invention, the board is connected to an eye, chain link or like member adapted to slide on the line connecting said board to the net and a stop piece is provided on said line, for cooperating with the said eye member, the said line being connected to the hawser running to the boat by an intermediate cable the length whereof is greater than the distance between said stop piece and the attaching point of said cable with said hawser when the hawser is connected to the board and towing tension is applied from the boat to the net through said board.

In the accompanying drawing, given by way of example:

Figure 1:
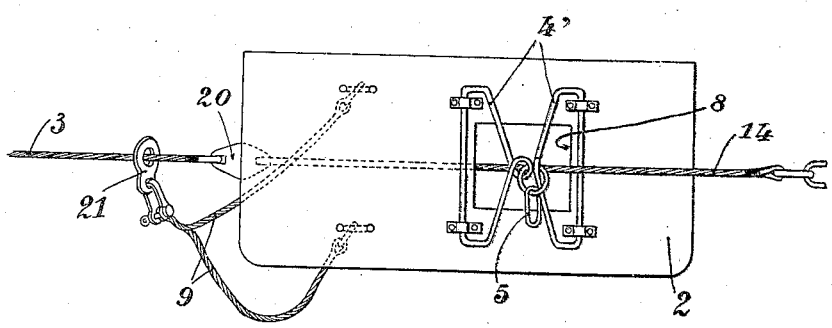
Fig. 1 shows the improved arrangement in the position for hauling the net on board, the board being then hung on deck.

As is well known, the hawser 1 connected with the boat is attached at the other end to the board 2 as well as the line 3 which proceeds to the brace of the net wing. In the construction shown in the drawing, the board 2 is provided on its inner face with two brackets 4 carrying a chain 5 provided with a shackle 7. Between the brackets, the board is provided with an opening 8. To the outer face of the board is attached a crow's foot 9 carrying a shackle 10.

According to the drawing, the end of the intermediate cable is connected to the line 3 through the medium of a coupling piece 20. The crow's foot 9 attached to the outer face of the board 2 is provided with a ring 21 through which the line 3 extends. The dimension of the central opening of said ring is such that the coupling 20 cannot pass through the same and acts as a stop piece. The intermediate cable has a length greater than the distance $x$—$y$ between the piece 20 and the shackle 7, during the operation, when the net is towed.

A turnbuckle 22 may be disposed as shown in Fig. 3 at the end of the line 3 and is connected with the crow's foot 23 which is secured to the wing of the net.

The operations for bringing in or letting out the net are the following:

When it is desired to bring in the net, each hawser 1 is wound on the fishing winch; each board 2 is thus drawn upon, and by means of the crow's foot 9 and its link 21, the line 3 and the net are brought up. When the board is brought out of the water, it is attached to the bracket adapted for this purpose and the shackle 7 is removed. For this purpose the winch is rotated backward so as to slacken the hawser 1 and the link 12 can easily be removed from the shackle 7. The cable 14 and the line 3 are then wound in a continuous manner, since the line 3 slides without difficulty in the link 21 (Fig. 1).

For the letting out, the inverse operation is performed.

Figure 2:
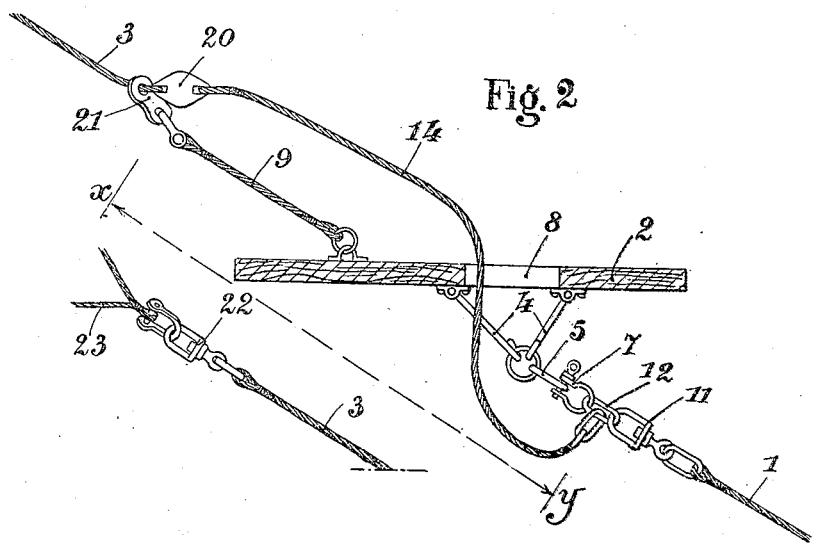
Fig. 2 shows the arrangement in the fishing position, showing only the terminals of the line 3.

For the fishing (position of Fig. 2), it will be seen that as the hawser 1 draws upon the board 2, the crow's foot 9 causes the link 21 to slide upon the line 3 until the latter is caused to meet the stop-piece 20, and from this time onward, the traction of the net takes place normally.

The operation is thus very easy and rapid.

The invention is not limited, of course, to the details of construction shown and described and these have been chosen only by way of example.

Having now described our invention, what we claim as new and desire to secure by Letters Patent is:

1. A towing device for trawl nets comprising a towing line adapted to be connected to one of the net wings, an otter board, a tow hawser adapted to be connected to the boat, means for detachably connecting the tow hawser to the inner face of said board, a sliding member connected to the outer face of said board and adapted to slide on the towing line, a stop-piece on said towing line adapted to engage with the sliding member and an intermediate cable connecting the stop piece to the hawser.

2. A towing device for trawl nets comprising a towing line adapted to be connected to one of the net wings, an otter board, a tow hawser adapted to be connected to the boat, a bracket on the inner face of the board, a detachable shackle for connecting the bracket to the hawser, a sliding member connected to the outer face of said board and adapted to slide on the towing line, a stop-piece on said towing line adapted to engage with the sliding member and an intermediate cable connecting the stop piece to the hawser.

3. A towing device for trawl nets comprising a towing line adapted to be connected to one of the net wings, an otter board, a tow hawser adapted to be connected to the boat, a bracket on the inner face of the board, a detachable shackle for connecting the bracket to the hawser, a link connected to the outer face of said board and adapted to slide on the towing line, a stop-piece on said towing line adapted to engage with the link and an intermediate cable connecting the stop piece to the hawser.

In testimony whereof we have signed our names to this specification.

RENÉ LOUIS MARIE DANIÉLOU.
JACQUES JULES VERHOËVEN.